United States Patent [19]

Harris

[11] Patent Number: 5,258,862
[45] Date of Patent: Nov. 2, 1993

[54] ROTATING DISC OPTICAL SYNCHRONIZATION SYSTEM USING BINARY DIFFRACTIVE OPTICAL ELEMENTS

[75] Inventor: Ellis D. Harris, Claremont, Calif.
[73] Assignee: Xerox Corporation, Stamford, Conn.
[21] Appl. No.: 988,504
[22] Filed: Dec. 10, 1992
[51] Int. Cl.$^5$ .............. G02B 5/18; G02B 27/44; G06K 7/10
[52] U.S. Cl. .................. 359/17; 359/18; 359/565; 359/569; 235/457
[58] Field of Search ............. 359/17, 18, 565, 566, 359/569; 235/457

[56] References Cited

U.S. PATENT DOCUMENTS

| | | |
|---|---|---|
| 3,619,033 | 11/1971 | McMahon . |
| 4,289,371 | 9/1981 | Kramer . |
| 4,678,263 | 7/1987 | Funato . |
| 4,758,058 | 7/1988 | Cato et al. . |
| 4,810,046 | 3/1989 | Yamagishi et al. . |
| 4,895,790 | 1/1990 | Swanson et al. ............ 430/321 |
| 5,073,007 | 12/1991 | Kedmi et al. ............ 359/565 |

OTHER PUBLICATIONS

W. Veldkamp & T. McHugh, "Binary Optics", *Scientific American*, vol. 266, No. 5, May 1992, pp. 92-97.
G. J. Swanson, "Binary Optics Technology: The Theory and Design of Multi-Level Diffractive Optical Elements", Lincoln Laboratory, Massachusetts Institute of Technology, *Technical Report 854*, Aug. 14, 1989.

*Primary Examiner*—Martin Lerner
*Attorney, Agent, or Firm*—William Propp

[57] ABSTRACT

An optical synchronization system uses a stationary binary diffractive optical element and a rotating disc with alternating binary diffractive optical elements and blocking elements to create a moire pattern of a synchronization signal for a pixel clock.

10 Claims, 4 Drawing Sheets

ROTATING DISC OPTICAL SYNCHRONIZATION SYSTEM USING BINARY DIFFRACTIVE OPTICAL ELEMENTS

CROSS-REFERENCE TO RELATED APPLICATIONS

This application contains subject matter that is related to subject matter of patent application Ser. No. 07/989,321, filed Dec. 11, 1992, and patent application Ser. No. 07/989,313, filed Dec. 11, 1992, both assigned to the same assignee herein.

BACKGROUND OF THE INVENTION

This invention relates to an optical synchronization system for a rotating disc, and, more particularly, to an optical synchronization system with binary diffractive optical elements for a rotating disc.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle is referred to as the diffraction efficiency. The diffraction efficiency of a diffractive element is determined by the element's surface profile. If the light that is not redirected by the desired angle is substantial, the result will be an intolerable amount of scatter in the image or output plane of the optical system.

Theoretically, diffractive phase elements can achieve 100 percent diffraction efficiency at a given wavelength. To achieve this efficiency, however, a continuous phase profile is necessary. The theoretical diffraction efficiency of this surface profile is also relatively sensitive to a change in wavelength. By contrast, refractive elements are wavelength insensitive. The technology for producing high quality, high efficiency, continuous phase profiles does not presently exist.

A compromise that results in a relatively high diffraction efficiency and ease of fabrication is a multi-level phase grating. The larger the number of discrete phase levels, the better the approximation of the continuous phase function. These multi-level phase profiles can be fabricated using standard semiconductor integrated circuit fabrication techniques.

As disclosed in *Binary Optics Technology: The Theory and Design of Multi-level Diffractive Optical Elements* by G. J. Swanson of the Lincoln Laboratory at the Massachusetts Institute of Technology, (Technical Report 854 Aug. 14, 1989) and the resulting U.S. Pat. No. 4,895,790, a fabrication process for a binary diffractive optical element or multi-level phase profile diffraction grating starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material is coated with a thin layer of photoresist. The lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary phase surface relief grating.

The process is repeated using a lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process is repeated a third and fourth time with lithographic masks having periods of one-quarter and one-eighth that of the first mask, and etching the substrates to depths of one-quarter and one-eighth that of the first etch. The successive etches result in elements having 8 and 16 phase levels.

This process is repeated to produce a multilevel phase relief structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. This mask and etch fabrication process can be carried out in parallel, producing many elements simultaneously, in a cost-effective manner.

A 16 phase level structure achieves 99 percent diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

The photolithographic etch steps can be done in any order. Alternatively, the highest pitch, shallowest level is processed first since this level is more difficult to control if etched following deeper etches.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

Optical scanning systems are used to scan a spot of light along a predetermined pattern such as a scan line on a photoreceptor. Optical elements such as refractive lens or diffractive holograms or gratings can be disposed circumferentially in annular sectors around a rotating disc to generate a scan line and function as an optical scanning system. Even binary diffractive optical elements can be used as the scanning elements in a rotating disc optical scanner as taught in copending patent applications Ser. Nos. 07/989,445 and 07/989,320), commonly assigned with the present application and herein incorporated by reference.

One of the problems inherent in any optical scanning system is monitoring and synchronizing the scanning point of light along the scan line and from scan line to scan line. This is typically done with photodetectors located on a photoreceptor located at the start of scan and the end of scan. But these photodetectors do not monitor and synchronize the entire continuous scan, only the ends.

An alternate system would remove a portion of the scanning beam itself to provide the monitoring and synchronizing function.

It is an object of this invention to provide an optical synchronization system for a rotating disc using binary diffractive optical elements.

It is another object of this invention to provide an optical synchronization system over the entire continuous scan line.

It is another object of this invention to provide an optical synchronization system which does not use the scanning beam itself.

SUMMARY OF THE INVENTION

In accordance with the present invention, an optical synchronization system uses a stationary binary diffractive optical element and a rotating disc with alternating binary diffractive optical elements and blocking elements to create a moire pattern for a synchronization signal for a pixel clock. The stationary binary diffractive optical element and the alternating binary diffractive optical elements and blocking elements will have the same multilevel phase relief structure diffraction pattern. The optical synchronization system using a stationary binary diffractive optical element and a rotating disc with alternating binary diffractive optical elements and blocking elements can either be reflective or transmissive.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
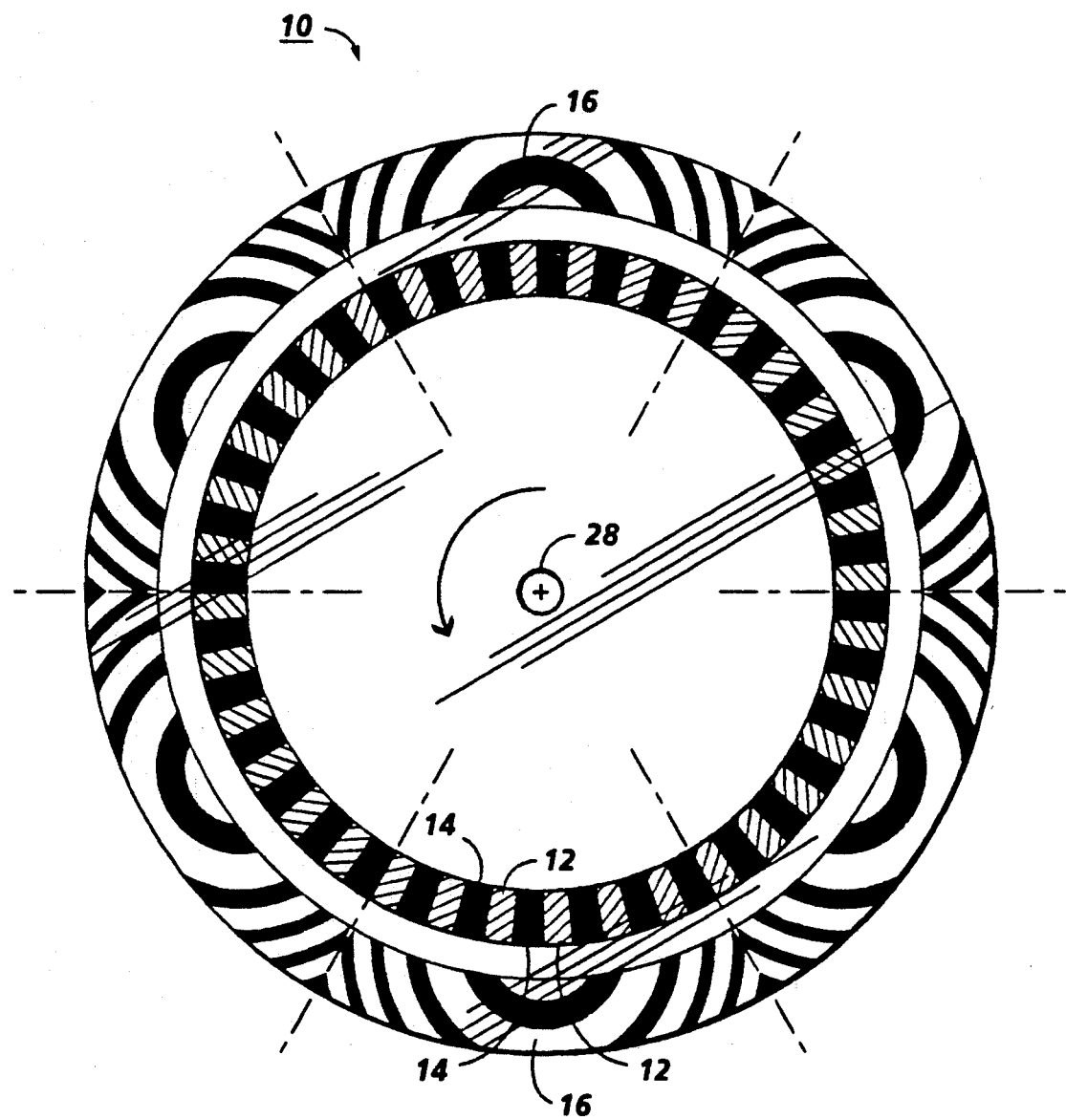
FIG. 1 is a schematic illustration of the binary diffractive optical element disc for an optical synchronization system formed according to the present invention.

Reference is now made to FIG. 1, wherein there is illustrated a rotatable transparent disc 10 which has a plurality of binary diffractive optical elements 12 disposed circumferentially in annular sectors around the disc to generate an optical synchronization signal, specifically a moire pattern, for a pixel clock.

Figure 2:
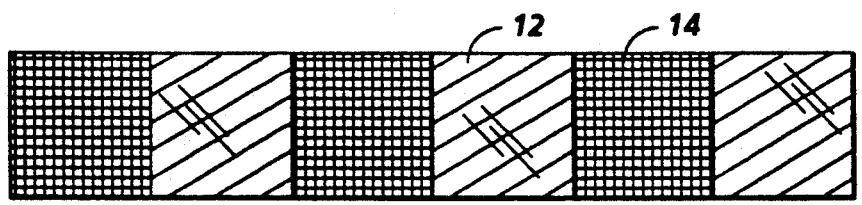
FIG. 2 is a schematic illustration of the annular sectors of alternating binary diffractive optical elements and blocking elements of the binary diffractive optical element disc of FIG. 1 formed according to the present invention.

As shown in FIG. 2, the binary diffractive optical elements 12 alternate with blocking elements 14 in the annular sectors. The multilevel phase relief structure of the binary diffractive optical element will diffract any incident light while the stop or light absorbing patch of the blocking element will prevent the transmission of any incident light. The binary diffractive optical element 12 and the blocking element 14 have the same width and height and cover the same surface area on the annular sector of the rotatable transparent disc 10.

The multilevel phase relief structure of each binary diffractive optical element 12 is the same so that any incident light beam will be diffracted exactly the same.

The rotatable disc 10 also has the scanning elements 16 such as holograms, diffraction gratings, binary diffractive optical elements and the like disposed circumferentially in annular sectors around the disc to generate a scan line. A light beam (not shown) will be diffracted or refracted by the scanning element to form a scanning beam (not shown) to scan a scan line (not shown). A plurality of the plurality of alternating binary diffractive optical elements and blocking elements will correspond to a scanning element so that the optical synchronization system for the rotating disc is for an optical scanning system on the rotating disc.

If the scanning elements 16 on the rotating disc 10 are binary diffractive optical elements as disclosed in co-pending patent applications Ser. Nos. 07/989,445 and 07/989,320, then the alternating binary diffractive optical elements 12 of the optical synchronization system can be fabricated at the same time and by the same method as the optical scanning system.

Figure 3:
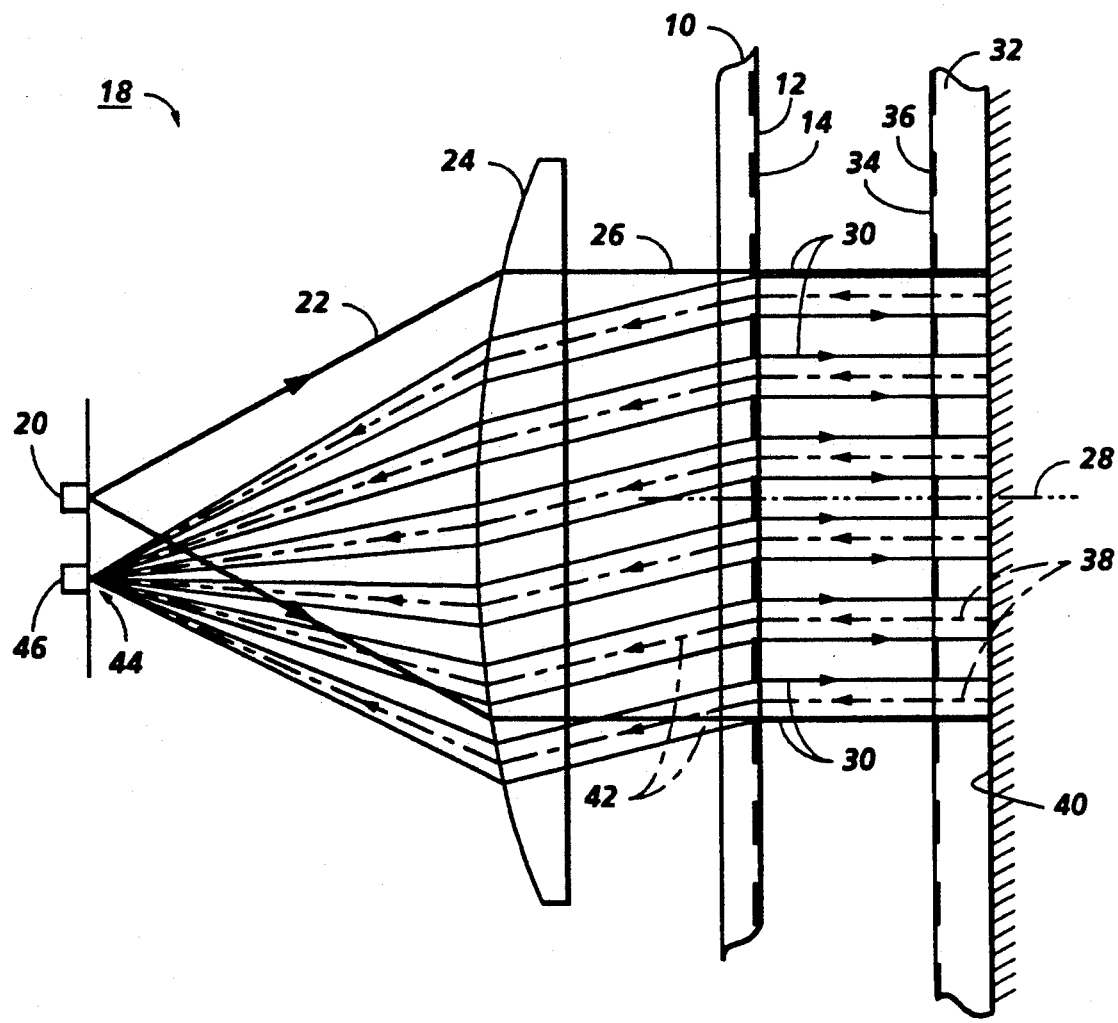
FIG. 3 is a schematic illustration of a reflective optical synchronization system using a rotating binary diffractive optical element disc formed according to the present invention.

The optical synchronization system 18 of FIG. 3, has a light source 20, such as a visible diode laser separate from the optical scanning system light source, which emits a coherent light beam 22 of a single wavelength. The light beam 22 is collimated by collimating lens 24, which may be a molded glass aspherical collimating lens.

The collimated beam 26 is then incident upon the binary diffractive optical elements 12 and the blocking elements 14 of the rotating disc 10. The light beam 26 will typically have a normal or perpendicular angle of incidence to the rotating binary diffractive optical and blocking element disc 10.

The disc 10 is rotatable about an axis of rotation 28. The rotating disc is driven at a constant speed by a motor (not shown) coupled to the rotor (also not shown) along the axis of rotation of the disc. The rotational movement of the disc 10 will cause the alternating binary diffractive optical elements 12 and the blocking elements 14 to align and misalign with the alternating binary diffractive optical elements and the blocking elements of the stationary binary diffractive optical element causing the incident light beam to be interrupted repeatedly as the disc rotates. The multilevel phase relief structure of the binary diffractive optical element 12 will transmit and diffract any incident light 26 while the blocking element 14 will prevent the transmission of any incident light 26.

Each of the phase levels in the multilevel phase relief structure of the binary diffractive optical element is a diffractive grating with the pitch varying over the entire element. As the element rotates with the disc, the multilevel phase relief structure of the binary diffractive optical element moves through an incident light beam and this beam is deflected according to the local pitch, resulting in a diffracted beam 30.

The diffracted light 30 from the binary diffractive optical elements 12 of the rotating disc 10 is incident upon a stationary binary diffractive optical element 32. The stationary binary diffractive optical element 32 will function as a diffraction grating reticule. The multilevel phase relief structure of the stationary binary diffractive optical element 32 is the same as that of the multilevel phase relief structure of the binary diffractive optical elements 12 and the blocking elements 14 of the rotating disc 10.

The stationary binary diffractive optical element 32 therefore consists of alternating binary diffractive optical elements 34 and the blocking elements 36. The multilevel phase relief structure of the binary diffractive optical element 34 will diffract any incident light 30 while the stop or light absorbing patch of the blocking element 36 will prevent the transmission of any incident light 30. The light beam 38 deflected by the binary diffractive optical elements 34 of the stationary binary diffractive optical element 32 is reflected from a mirror 40 through the stationary binary diffractive optical element 32 again but from the opposite side. The incident beam 38 will be blocked by blocking element 36 or diffracted by the binary diffractive optical elements 34 forming diffracted beam 41.

The beam 41 from the stationary binary diffractive optical element is then incident upon the binary diffractive optical elements 12 and the blocking elements 14 of the rotating disc 10 from the opposing side. The incident beam 41 will be blocked by blocking element 14 or diffracted by the binary diffractive optical elements 12 to form diffracted beam 42.

The beam 42 is then focussed by collimating lens 24 to a point 44 where a photodetector 46 is positioned to receive the light. Collimating lens 24 acts as a focussing lens since the light is incident upon the opposing surface. The focusing position 44 is different from the position of the light source 20 since the beam has been diffracted and thus displaced spatially.

Light alternately being blocked and propagating through the rotating binary diffractive optical element and then through the stationary binary diffractive optical element will create a moire pattern since the multilevel phase relief structure is the same for both elements.

This moire pattern of alternating light upon the photodetector will generate a series of synchronization signals for a pixel clock for an optical scanning system elsewhere on the rotating disc 10.

The detected signal by the photodetector is at a submultiple of the required pixel clock frequency. The light will be chopped as the identical diffraction patterns on the rotating binary diffractive optical element alternately align with blocking and diffractive elements on the stationary binary diffractive optical element. If the shape and spacing of the identical multilevel phase relief structure diffraction patterns are chosen appropriately, the electronic signal developed at the photodetector can be the pixel clock.

It is not essential to the present invention that the optical path be from the rotating binary diffractive optical element disc to the stationary binary diffractive optical element to the stationary binary diffractive optical element again and to the rotating binary diffractive optical element disc again.

Figure 4:
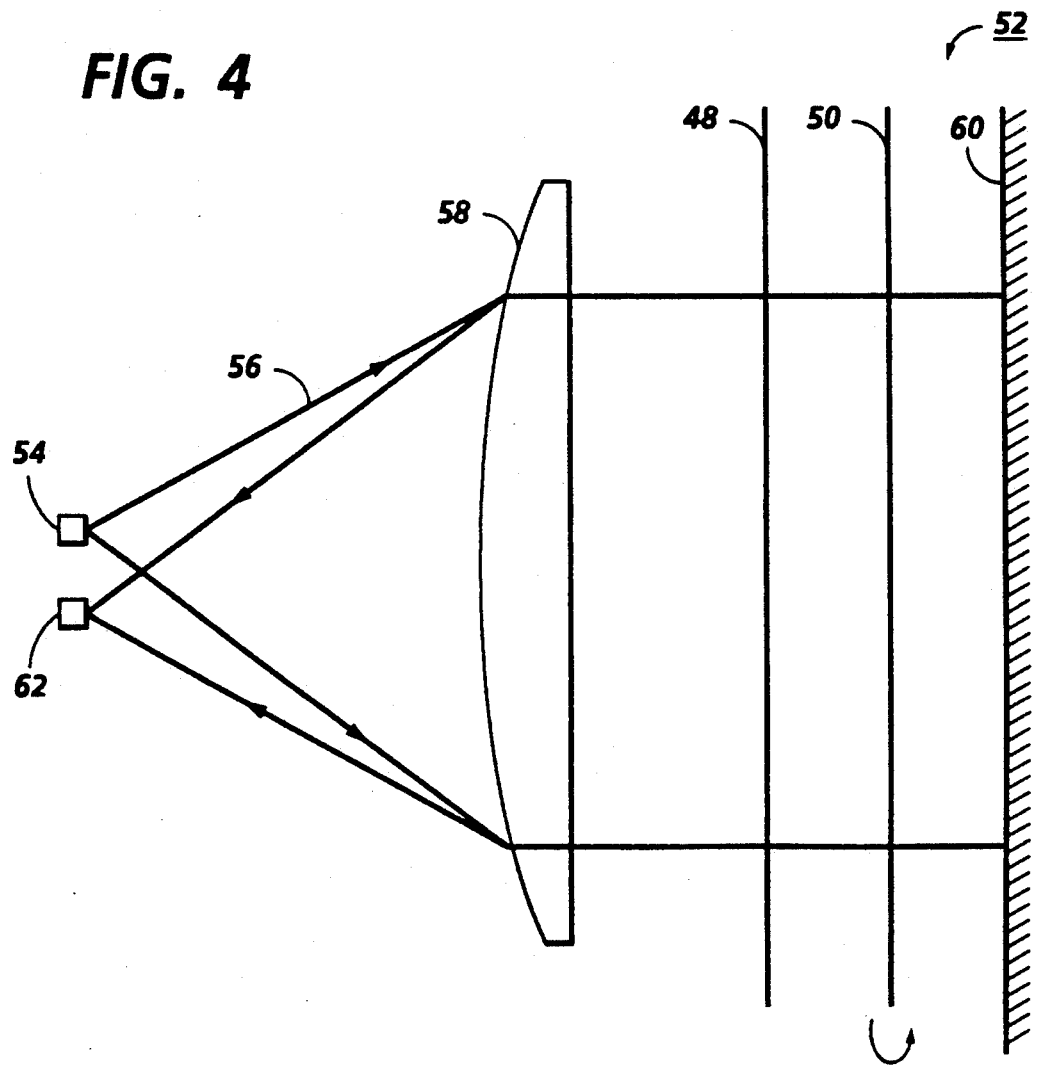
FIG. 4 is a schematic illustration of an alternate embodiment of a reflective optical synchronization system using a rotating binary diffractive optical element disc formed according to the present invention.

As shown in FIG. 4, the positions of the stationary binary diffractive optical element 48 and the rotating binary diffractive optical element disc 50 can be transposed and the optical synchronization system 52 will still perform the same functions.

Thus, a light source 54 emits a coherent light beam 56 which is collimated by collimating lens 58. The light is then incident upon the stationary binary diffractive optical element 48. The light will be blocked by the blocking elements of the stationary binary diffractive optical element 48 and diffracted by the binary diffractive optical elements of the stationary binary diffractive optical element 48.

The light is then incident upon the rotating binary diffractive optical element disc 50. The light will be blocked by the blocking elements of the rotating binary diffractive optical element disc 50 and diffracted by the binary diffractive optical elements of the rotating binary diffractive optical element disc 50. The light is then reflected back by the mirror 60 to the rotating binary diffractive optical element disc 50. The light will be blocked by the blocking elements of the rotating binary diffractive optical element disc 50 and diffracted by the binary diffractive optical elements of the rotating binary diffractive optical element disc 50.

The light is then incident upon the stationary binary diffractive optical element 48. The light will be blocked by the blocking elements of the stationary binary diffractive optical element 48 and diffracted by the binary diffractive optical elements of the stationary binary diffractive optical element 48. The light is then focussed by the collimating lens 58 upon a photodetector 62.

Figure 5:
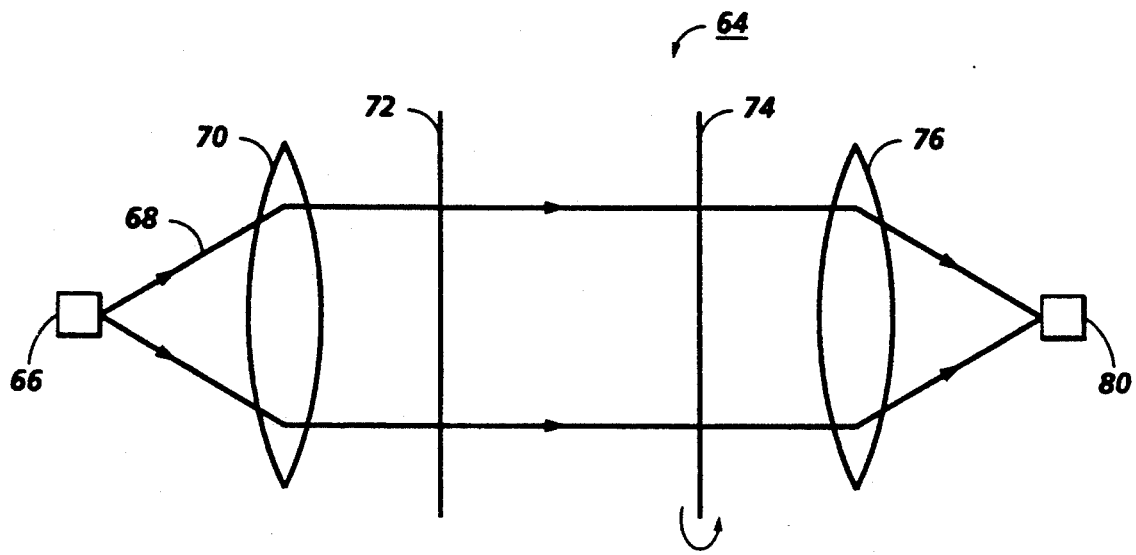
FIG. 5 is a schematic illustration of a transmissive optical synchronization system using a rotating binary diffractive optical element disc formed according to the present invention.

It is also not essential that the optical synchronization system be a reflective system. As shown in FIG. 5, the optical synchronization system 64 can be a transmissive system and still perform the same functions.

Thus, a light source 66 emits a coherent light beam 68 which is collimated by collimating lens 70. The light is then incident upon the stationary binary diffractive optical element 72. The light will be blocked by the blocking elements of the stationary binary diffractive optical element 72 and diffracted by the binary diffractive optical elements of the stationary binary diffractive optical element 72.

The light is then incident upon the rotating binary diffractive optical element disc 74. The light will be blocked by the blocking elements of the rotating binary diffractive optical element disc 74 and diffracted by the binary diffractive optical elements of the rotating binary diffractive optical element disc 74.

The light is then focussed by a focussing lens 76 upon a photodetector 80.

Once again, it is not essential in a transmissive optical synchronization system that the optical path be from the stationary binary diffractive optical element to the rotating binary diffractive optical element disc.

Figure 6:
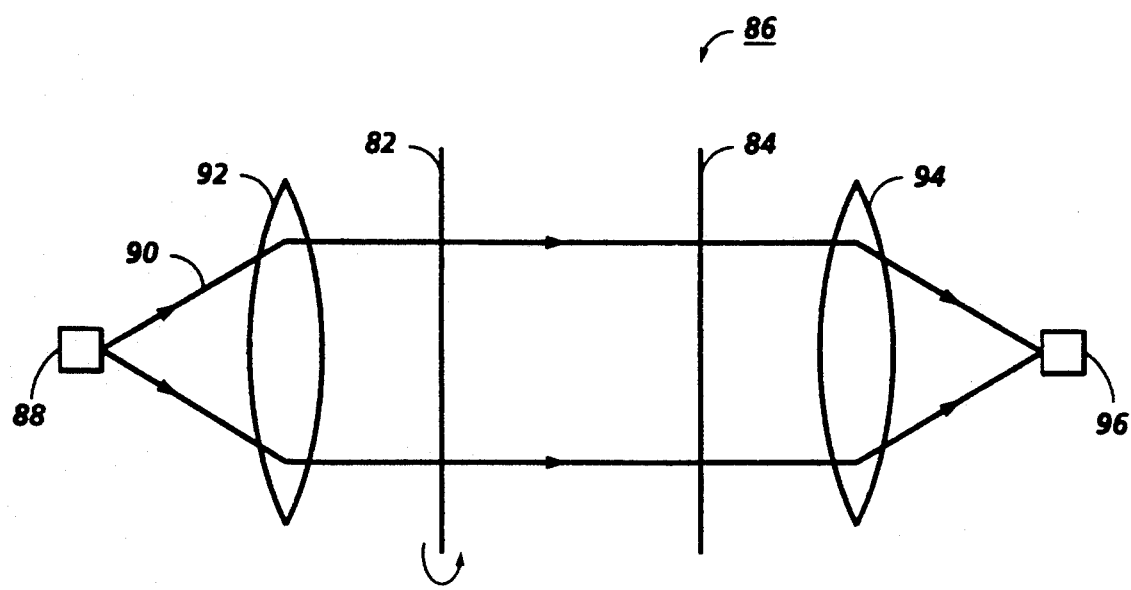
FIG. 6 is a schematic illustration of an alternate embodiment of a transmissive optical synchronization system suing a rotating binary diffractive optical element disc formed according to the present invention.

As shown in FIG. 6, the positions of the rotating binary diffractive optical element disc 82 and the stationary binary diffractive optical element 84 can be transposed and the optical synchronization system 86 will still perform the same functions.

Thus, a light source 88 emits a coherent light beam 90 which is collimated by collimating lens 92. The light is then incident upon the rotating binary diffractive optical element disc 82. The light will be blocked by the blocking elements of the rotating binary diffractive optical element disc 82 and diffracted by the binary diffractive optical elements of the rotating binary diffractive optical element disc 82.

The light is then incident upon the stationary binary diffractive optical element 84. The light will be blocked by the blocking elements of the stationary binary diffractive optical element 84 and diffracted by the binary diffractive optical elements of the stationary binary diffractive optical element 84.

The light is then focussed by a focusing lens 94 upon a photodetector 96.

Any spectral dispersion in any of the optical synchronization systems can be compensated by coordinating the positive dispersion of the glass collimating lens with the negative dispersion inherent in the stationary and rotating binary diffractive optical elements.

The incident light beam typically has a normal or perpendicular angle of incidence to the rotating binary diffractive optical element disc. The incident beam can be at the Bragg angle of incidence to reduce loss as the beam strikes the front surface of the rotating binary diffractive optical element disc. The incident beam can, however, have any angle of incidence to the rotating binary diffractive optical element disc.

The rotating binary diffractive optical element includes a negative binary diffractive lens element repeated in the sections of the annulus. The lens' effective focal length is a function of the radius, areas nearer the axis of rotation have shorter focal lengths. This variable effective focal length, increasing as the radius of the binary diffractive optical element on the disc increases, is compensated by the stationary binary diffractive optical element. The effect of the two binary diffractive optical elements is to bring the diffracted beam to a focus.

The rotating binary diffractive optical element need not be a negative optical element but can instead, be a positive element. A positive element would work with the stationary binary diffractive optical element to achieve focussing of the incident beam.

A wedge effect can incorporated in the binary diffractive optical elements in the one plane to insure that the diffracted beam can be physically and optically separated from the zero order, nondiffracted beam. Light would be diffracted by the wedge effect toward the center of the axis of rotation (or equivalently away from the center of the axis of rotation).

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical synchronization system for a rotating disc comprising:
    a light source for emitting a coherent light beam,
    means to collimate said coherent light beam,
    a first stationary binary diffractive optical element to alternately block and diffract said collimated light beam,
    a plurality of alternating second binary diffractive optical elements and blocking elements disposed circumferentially on said rotating disc such that said diffracted light beam from said first stationary binary diffractive optical element is alternately blocked by said alternating blocking elements and diffracted by said alternating second binary diffractive optical elements as said rotating disc rotates,
    reflecting means to reflect said diffracted light beam from said second binary diffractive optical elements on said rotating disc, such that said reflected light beam is alternately blocked by said alternating blocking elements and diffracted by said alternating second binary diffractive optical elements on said rotating disc as said rotating disc rotates, and said diffracted reflected light beam is alternately blocked and diffracted by said first stationary binary diffractive optical element, and
    focussing means to focus said double diffracted, reflected light beam onto a photodetector to generate a synchronization signal for rotation of said rotating disc.

2. The optical synchronization system for a rotating disc of claim 1 wherein said first stationary binary diffractive optical element and said plurality of alternating second binary diffractive optical elements and blocking elements have the same diffraction pattern.

3. The optical synchronization system for a rotating disc of claim 1 wherein said means to collimate said coherent light beam and said focussing means to focus said double diffracted, reflected light beam are the same optical element.

4. An optical synchronization system for a rotating disc comprising:
   a light source for emitting a coherent light beam,
   means to collimate said coherent light beam,
   a plurality of alternating first binary diffractive optical elements and blocking elements disposed circumferentially on said rotating disc such that said collimated light beam is alternately blocked by said alternating blocking elements and diffracted by said alternating first binary diffractive optical elements as said rotating disc rotates,
   a second stationary binary diffractive optical element to alternately block and diffract said diffracted light beam from said first binary diffractive optical elements,
   reflecting means to reflect said diffracted light beam from said second stationary binary diffractive optical element, such that said reflected light beam is alternately blocked and diffracted by said second stationary binary diffractive optical element, and said diffracted reflected light beam is alternately blocked by said alternating blocking elements and diffracted by said alternating first binary diffractive optical element on said rotating disc as said rotating disc rotates, and
   focussing means to focus said double diffracted, reflected light beam onto a photodetector to generate a synchronization signal for rotation of said rotating disc.

5. The optical synchronization system for a rotating disc of claim 4 wherein said plurality of alternating first binary diffractive optical elements and blocking elements and said second stationary binary diffractive optical element have the same diffraction pattern.

6. The optical synchronization system for a rotating disc of claim 4 wherein said means to collimate said coherent light beam and said focussing means to focus said double diffracted, reflected light beam are the same optical element.

7. An optical synchronization system for a rotating disc comprising:
   a light source for emitting a coherent light beam,
   means to collimate said coherent light beam,
   a first stationary binary diffractive optical element to alternately block and diffract said collimated light beam,
   a plurality of alternating second binary diffractive optical elements and blocking elements disposed circumferentially on said rotating disc such that said diffracted light beam from said first stationary binary diffractive optical element is alternately blocked by said alternating blocking elements and diffracted by said alternating second binary diffractive optical elements as said rotating disc rotates, and
   focussing means to focus said double diffracted light beam from said plurality of alternating second binary diffractive optical elements onto a photodetector to generate a synchronization signal for rotation of said rotating disc.

8. The optical synchronization system for a rotating disc of claim 7 wherein said first stationary binary diffractive optical element and said plurality of alternating second binary diffractive optical elements and blocking elements have the same diffraction pattern.

9. An optical synchronization system for a rotating disc comprising:
   a light source for emitting a coherent light beam,
   means to collimate said coherent light beam,
   a plurality of alternating first binary diffractive optical elements and blocking elements disposed circumferentially on said rotating disc such that said collimated light beam is alternately blocked by said alternating blocking elements and diffracted by said alternating first binary diffractive optical elements as said rotating disc rotates,
   a second stationary binary diffractive optical element to alternately block and diffract said diffracted light beam from said first binary diffractive optical elements, and
   focussing means to focus said double diffracted light beam from said second stationary binary diffractive optical element onto a photodetector to generate a synchronization signal for rotation of said rotating disc.

10. The optical synchronization system for a rotating disc of claim 9 wherein said plurality of alternating first binary diffractive optical elements and blocking elements and said second stationary binary diffractive optical element have the same diffraction pattern.

* * * * *